Feb. 23, 1965   SABURO MIYATA MORIYA   3,170,871
MAGNETIC FILTER
Filed Nov. 22, 1960
Fig-1
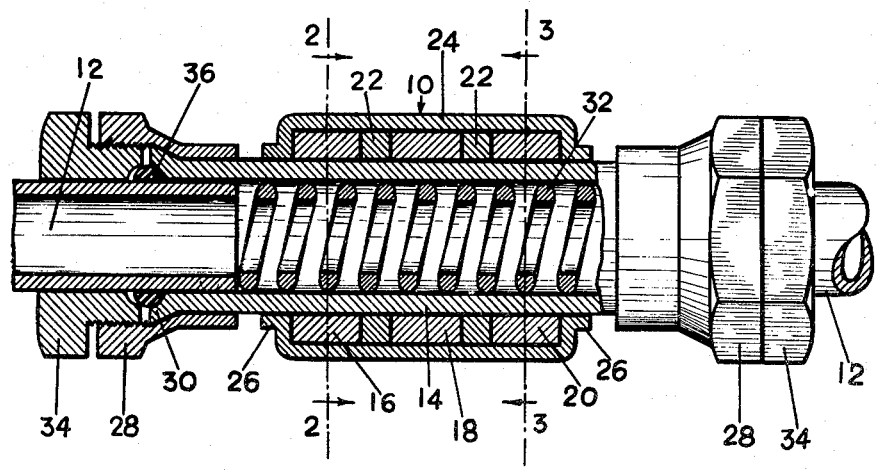
Fig-2
Fig-3
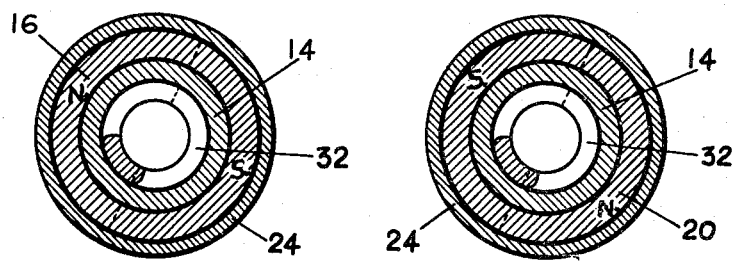
Fig-5
Fig-4
Fig-7
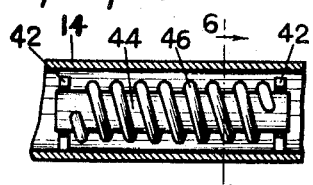
Fig-6
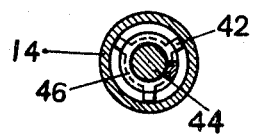
INVENTOR.
S. Miyata Moriya.
BY
C. Chandlee Pidgeon
AGENT

United States Patent Office 3,170,871
Patented Feb. 23, 1965

3,170,871
MAGNETIC FILTER
Saburo Miyata Moriya, 58 Shimo Takanawa,
Yokohama, Japan
Filed Nov. 22, 1960, Ser. No. 71,095
4 Claims. (Cl. 210—222)

This invention relates to a magnetic filter and more particularly to a filter adapted to be inserted in a fluid line for removing paramagnetic particles.

The fluid line may be the hydraulic system of an aircraft or other hydraulic fluid activated devices; the fuel or oil lines of motor vehicles, engines or the like. Some paramagnetic particles are so minute that they pass through customary filters and sooner or later cause damage and wear to the devices in which the customary filters are used.

An object of this invention is the provision of a magnetic filter adapted to be inserted in a fluid line.

A further object of the invention is the provision of a magnetic filter having a highly concentrated flux area in the path of fluid flow.

These and other objects will appear upon consideration of the following specification, which taken with the accompanying drawings form a complete disclosure of my invention.

In the drawings:

FIG. 1 is a part sectional elevational of a preferred form of my novel filter;

FIG. 2 is a section on the line 2—2 of FIG. 1;

FIG. 3 is a section on the line 3—3 of FIG. 1, and

FIG. 4 is a perspective view of one of my magnets.

FIG. 5 is a part sectional elevation of another form of my novel filter.

FIG. 6 is a section on the line 6—6 of FIG. 5.

FIG. 7 is a perspective view of another type of my magnets.

Referring now to the drawings, I show in FIG. 1 a sectional view of a filter unit 10, which is to be connected in a fluid line 12. The filter unit 10 comprises a tube 14 having an inside diameter sufficient to accommodate the fluid line 12.

A plurality of ring magnets 16, 18 and 20, having inside diameters to fit the tube 14 snugly, are placed over the tube 14 and are spaced apart by non-magnetic spacer rings 22. A sleeve 24 is placed over the magnet assembly just described and has the ends thereof spun down as at 26 to embrace the tube 14 snugly.

A friction fitting nut 24 is placed over each end of the tube 14, and the ends of the tube 14 are flared as at 30 to retain the fitting nut 28. A coil spring 32, with spaced turns, is placed inside the tube 14, and said tube is slipped over facing ends of the line 12, which has been cut to receive the filter. Before placing the filter assembly on the line 12, a pair of friction fitting lock nuts 34 are placed on the ends of the cut line, and when the assembly is in place the friction lock nuts 34 are tightened against the soft metal gaskets 36.

Each of the magnets 16, 18 and 20 is preferably formed as an annulus of ferrite, particularly barium ferrite. These rings are magnetized on a diameter, and the axes of magnetization are rotated 90° relative to each other as more particularly shown in FIGS. 2 and 3. This displacement presents, in effect, a rotating magnetic field to the passing particles to hereby impart a centrifugal effect to the particles entrained in the fluid stream. By this means the particles that escape capture by the first magnet will be quickly brought closer to the next magnet for capture and so on for the series of magnets. The spaces between the coils of the spring 32 form protecting recesses or pockets for the accumulation of paramagnetic material removed from the fluid passing through the filter and prevents the attracted particles from being torn free by the flow.

The opposite magnetic flux example is illustrated in FIG. 5 wherein the annular magnets are replaced by rod magnet 44, FIG. 6. A coil spring 46 with spaced turns is slipped over the rod magnet 44, magnetized on the diameter. The outside diameter of the coil 46 obviously being less than the inside diameter of tube 14, is centered by non-magnetic spacers 42 positioned over the ends of the magnet 44 when inserted in tube 14.

The spaces between the coils of the spring 46 also form protective recesses or pockets which keep the attracted particles out of the main stream.

I have provided two simple effective magnetic filters which may be easily inserted in any fluid line, and which can be quickly removed for cleaning or replacement.

While preferred forms of my novel filter have been shown, it is to be undertsood that modifiecation may be made within the skill of the art and the scope of the appended claims.

I claim:

1. A magnetic filter line comprising a rigid tubular casing of non magnetic material, means for connecting said casing into a fluid carrying line, a magnet assembly including a plurality of annular permanent magnets axially spaced apart along the length of and surrounding said casing; said magnets being spaced apart by annuli of non magnetic material, a rigid housing of non magnetic material surrounding and enclosing said magnets, each of said magnets being magnetized on the diameter of each annulus, and having the axes of magnetization progressively angularly offset relative to each other along the length of said series.

2. The structure as defined in claim 1 including sediment traps within the casing.

3. The structure as defined in claim 2 wherein the sediment traps are formed by a spring having spaced apart coils placed within the casing.

4. The structure as defined in claim 3 wherein the annular magnets are formed of sintered ferrite.

References Cited in the file of this patent

UNITED STATES PATENTS

| 1,806,002 | Simms | May 19, 1931 |
|---|---|---|
| 2,583,522 | Winslow | Jan. 22, 1952 |
| 2,619,674 | Stem | Dec. 2, 1952 |
| 2,652,925 | Vermeiren | Sept. 22, 1953 |
| 2,690,842 | Spluvak | Oct. 5, 1954 |
| 2,974,981 | Vernest | Mar. 19, 1961 |

FOREIGN PATENTS

| 187,525 | Austria | Oct. 25, 1956 |